(12) United States Patent
Hosono et al.

(10) Patent No.: US 10,250,819 B2
(45) Date of Patent: Apr. 2, 2019

(54) IMAGE PROCESSING APPARATUS AND IMAGE PROCESSING METHOD

(71) Applicant: Olympus Corporation, Hachioji-shi, Tokyo (JP)

(72) Inventors: Kazuya Hosono, Chofu (JP); Hiroaki Iwasaki, Niiza (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/600,971

(22) Filed: May 22, 2017

(65) Prior Publication Data

US 2017/0359524 A1 Dec. 14, 2017

(30) Foreign Application Priority Data

Jun. 10, 2016 (JP) .................. 2016-116299

(51) Int. Cl.
*H04N 5/232* (2006.01)
*H04N 9/82* (2006.01)
*H04N 5/262* (2006.01)
*H04N 21/485* (2011.01)
*H04N 5/235* (2006.01)
*H04N 5/77* (2006.01)
*H04N 21/426* (2011.01)

(52) U.S. Cl.
CPC ......... *H04N 5/2621* (2013.01); *H04N 5/2356* (2013.01); *H04N 5/23222* (2013.01); *H04N 5/23232* (2013.01); *H04N 5/23267* (2013.01); *H04N 5/23293* (2013.01); *H04N 5/772* (2013.01); *H04N 9/8205* (2013.01); *H04N 21/4854* (2013.01); *H04N 21/42692* (2013.01)

(58) Field of Classification Search
CPC .... H04N 5/2621; H04N 9/8205; H04N 5/772; H04N 5/2356; H04N 5/23293; H04N 5/23222; H04N 5/23232; H04N 21/4854; H04N 5/23267; H04N 21/42692
See application file for complete search history.

(56) References Cited

U.S. PATENT DOCUMENTS

2010/0073488 A1\* 3/2010 Murase .................. G06T 11/60
348/207.1
2010/0077297 A1\* 3/2010 Hori ........................ G06T 11/60
715/243

(Continued)

FOREIGN PATENT DOCUMENTS

JP 2011-044966 3/2011
JP 2011-130167 6/2011

*Primary Examiner* — Hung H Lam
(74) *Attorney, Agent, or Firm* — John C. Pokotylo; Pokotylo Patent Services

(57) ABSTRACT

An image processing apparatus, comprising a memory that stores first image data, and a processor that includes an image associated information processing section, wherein the image associated information processing section, for the image data of a single frame that has been taken at a plurality of shooting conditions, within the first image data that has been stored in the memory, acquires image region information, relating to an image region in which shooting is carried out at different shooting conditions, and image associated information of the image region, associates the image region information and the image associated information and subjects the first image data to image processing, and generates second image data.

14 Claims, 9 Drawing Sheets

(56) References Cited

U.S. PATENT DOCUMENTS

| | | | | |
|---|---|---|---|---|
| 2010/0142814 A1* | 6/2010 | Damkjer | ................ | G06T 5/009 382/167 |
| 2010/0188704 A1* | 7/2010 | Hoarau | ............. | H04N 1/00196 358/1.16 |
| 2013/0162672 A1* | 6/2013 | Sen | ....................... | G09G 5/377 345/632 |
| 2013/0266292 A1* | 10/2013 | Sandrew | ................ | H04N 9/79 386/282 |
| 2014/0086506 A1 | 3/2014 | Ichikawa | | |

* cited by examiner

IMAGE PROCESSING APPARATUS AND IMAGE PROCESSING METHOD

CROSS-REFERENCE TO RELATED APPLICATIONS

Benefit is claimed, under 35 U.S.C. § 119, to the filing date of prior Japanese Patent Application No. 2016-116299 filed on Jun. 10, 2016. This application is expressly incorporated herein by reference. The scope of the present invention is not limited to any requirements of the specific embodiments described in the application.

BACKGROUND OF THE INVENTION

1. Field of the Invention

The present invention relates to an image processing apparatus and image processing method for carrying out processing to associate image data, and image associated information relating to that image data.

2. Description of the Related Art

In an imaging apparatus such as a digital camera there is one set of shooting conditions (for example, shutter speed, aperture value, ISO sensitivity etc.) when shooting a single frame. However, in recent years, it has been proposed to carry out shooting with a different shutter speed for every pixel or region, by changing exposure time for each pixel or line of an image sensor, as shown in Japanese patent laid-open No. 2011-044966 (hereafter referred to as "patent publication 1"). Also, Japanese patent laid-open No. 2011-130167 proposes an imaging apparatus that applies different image processing gain for each pixel or each image region of an image for a single taken frame, and generates images that have been taken with effectively different sensitivity (ISO sensitivity). In this way it is proposed to take a single frame at a plurality of shooting conditions.

Also, a plurality of images are combined and creation of an image of a single frame is carried out. For instance, an imaging apparatus is available on the market that acquires a plurality of images while making shooting conditions such as shutter speed and focus position different, and by combining the plurality of images, functions such as HDR combination where dynamic range is extended, and focus stacking where depth of focus is increased, are provided. By forming the image data for a single frame under various shooting conditions in this way, and combining, it is possible to obtain an image with an effect applied that can not be obtained with normal shooting.

Also, with digital cameras that are available on the market, and image processing apparatus etc. for processing digital camera images, information relating to images, such as shooting conditions, is made associated information (metadata) of the image data, and it is possible to apply processing and to store this metadata. Further, with a digital camera, when performing playback display of alive view image or an image that has already been taken, the images may be displayed with these items of associated information overlaid.

SUMMARY OF THE INVENTION

An image processing apparatus of a first aspect of the present invention comprises a memory that stores first image data, and a processor that includes an image associated information processing section, wherein the image associated information processing section, for the image data of a single frame that has been taken at a plurality of shooting conditions, within the first image data that has been stored in the memory, acquires image region information, relating to an image region in which shooting is carried out at different shooting conditions, and image associated information of the image region, associates the image region information and the image associated information, and subjects the first image data to image processing, and generates second image data.

An image processing method of a second aspect of the present invention comprises carrying out shooting with different shooting conditions and stores image data of a single frame, extracts image associated information for image data of the single frame, and carries out association of the image data for the single frame with the image associated information for every image region.

DETAILED DESCRIPTION OF THE PREFERRED EMBODIMENTS

An example where a digital camera is adopted as a preferred embodiment of the present invention will be described in the following. This camera has an imaging section, with a subject image being converted to image data by this imaging section, and the subject image being subjected to live view display on a display section arranged on the rear surface of the camera body based on this converted image data. A photographer determines composition and photo opportunity by looking at a live view display. At the time of a release operation image data is stored in a storage medium. Image data that has been stored in the storage medium can be subjected to playback display on the display section if playback mode is selected.

An image sensor of this camera also has an electronic shutter, and can make shutter speed (in other words, exposure time) different for every given region on an image sensor surface (refer to FIG. 3A and FIG. 3B, that will be described later). Specifically, when carrying out shooting of a single frame it is possible to carry out shooting at a plurality of shooting conditions. With this embodiment, when carrying out live view display, it is possible to display shooting conditions for each of respective regions (refer to FIG. 4A and FIG. 4B that will be described later). Also, when storing shooting conditions in image data, it is possible to store shooting conditions for each region (referred to FIG. 7B that will be described later).

Figure 1:
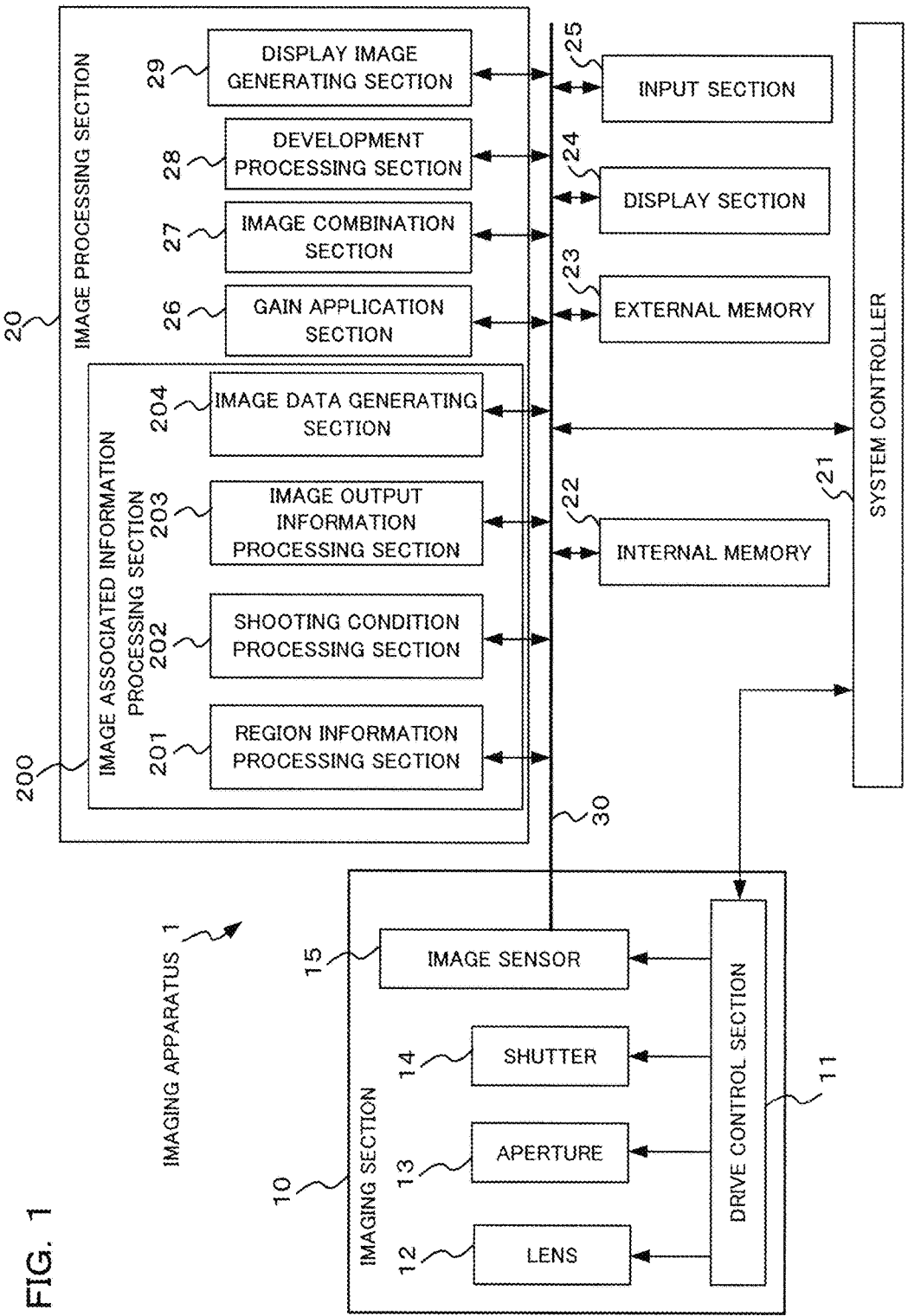
FIG. 1 is a block diagram mainly showing the electrical structure of a camera of a first embodiment of the present invention.

FIG. 1 is a block diagram mainly showing the electrical structure of a camera of a first embodiment of the present invention. The camera of this embodiment comprises an imaging section 10, an image processing section 20, a system controller 21 and a bus 30, with each section being connected to this bus. It should be noted that with this embodiment, a lens 12 and an aperture 13 included in the imaging section 10 are integrally formed with the camera body, but this integral structure is not limiting and it is also possible to provide the lens and aperture within an interchangeable lens for use with an interchangeable lens camera.

Inside the imaging section 10 there are provided a lens 12, aperture 13, shutter 14 and image sensor 15. The lens 12 is an optical lens for forming an optical image, and has a focus lens and a zoom lens. The aperture 13 is provided on the optical axis of the lens 12. This aperture 13 has opening diameter varied by a drive control section 11, and amount of light that passes through the aperture 13 is controlled.

The shutter 14 is also provided on the optical axis of the lens 12. This shutter 14 is a mechanical shutter, and the shutter 14 controls time for which light flux passes through the lens 12, namely the time for which light is incident on the image sensor 15 (exposure time, shutter speed). It should be noted that when carrying out live view display the shutter 14 is in an open state. Also, the aperture 13 is normally set to a wide-open F value.

The image sensor 15 is provided on the optical axis of the lens 12, and close to a position where an optical image of a subject is formed. The image sensor 15 includes an image sensor such as a CMOS image sensor or a CCD image sensor, and converts an optical image of a subject that has been formed by the lens 2 into a pixel signal for every pixel, before outputting this pixel signal to the bus 30. The bus 30 is a signal line for exchanging signals between each block. The image sensor 15 functions as an image sensor. This image sensor is capable of varying shutter speed for every pixel or every line (refer to FIG. 3A and FIG. 3B, that will be described later).

The lens 12, aperture 13, shutter 14 and image sensor 15 are connected to a drive control section 11. The drive control section 11 carries out drive control for the focus lens of the lens 12, carries out aperture value control for the aperture 13, and carries out opening and closing control of the shutter 14 (shutter speed control) in accordance with drive signals from the system controller 21. Also, the drive control section 11 has an imaging control circuit for the image sensor 15, and carries out charge accumulation control for the image sensor 15 and pixel signal readout control etc.

The image processing section 20 has a processor for image processing and is connected to the bus 30, and is provided with an image associated information processing section 200, gain application section 26, image combination section 27, development processing section 28, and display image generating section 29. The image associated information processing section 200 is provided with a region information processing section 201, shooting condition processing section 202, image output information processing section 203 and image data generating section 204.

Figure 4A:
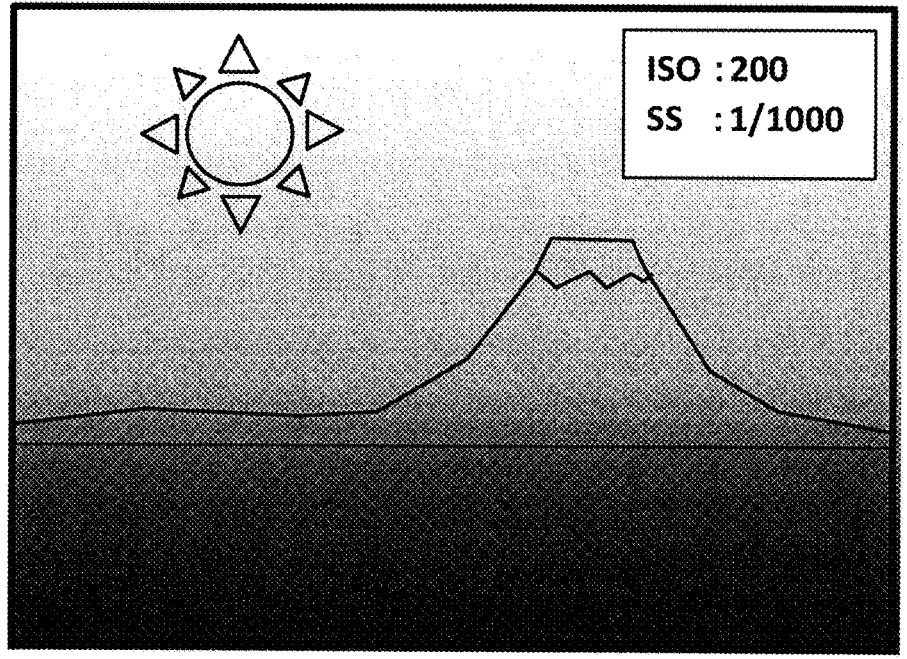
FIG. 4A and FIG. 4B are drawings showing one example of displaying a plurality of shooting conditions, in the camera of the first embodiment of the present invention.
Figure 4B:
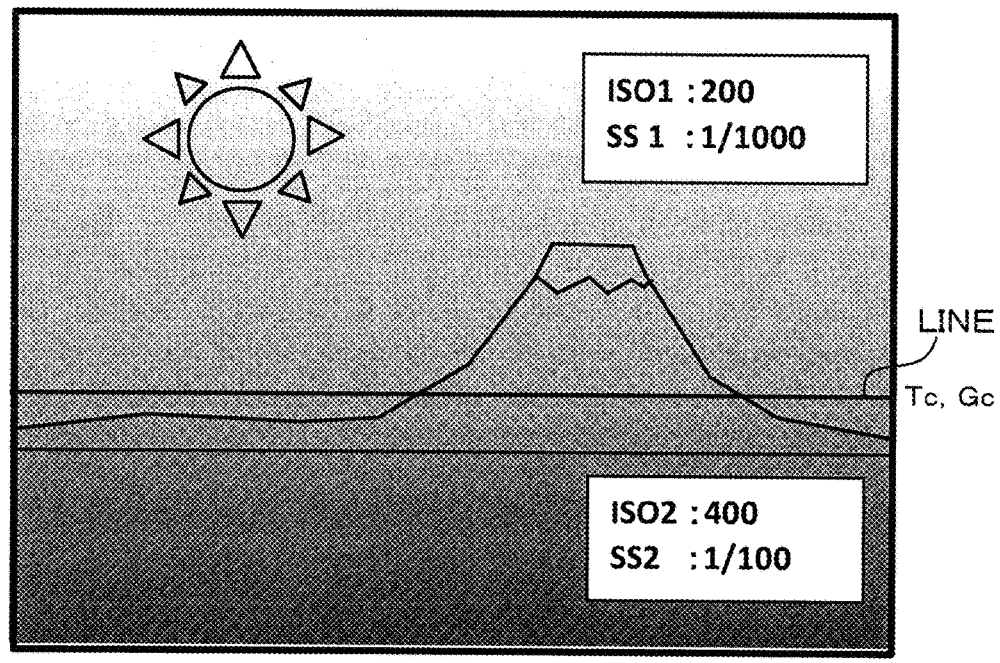
Figure 5A:
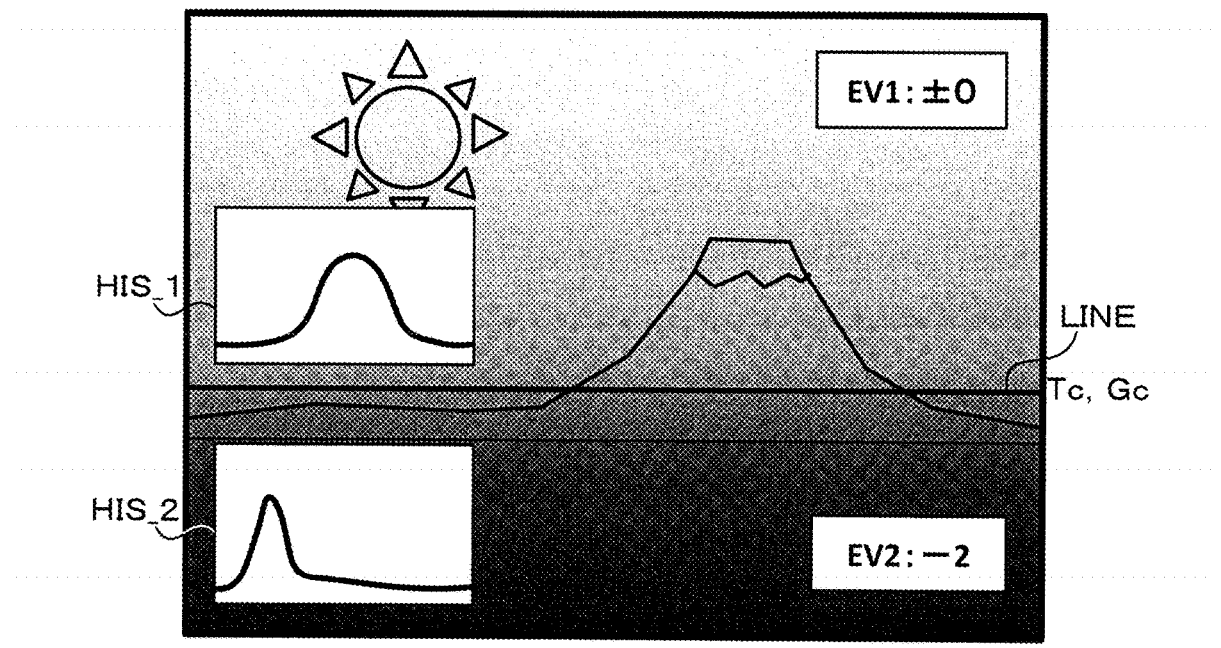
FIG. 5A and FIG. 5B are drawings showing one example of image output information processing when shooting at a plurality of shooting conditions, in the camera of the first embodiment of the present invention.
Figure 6A:
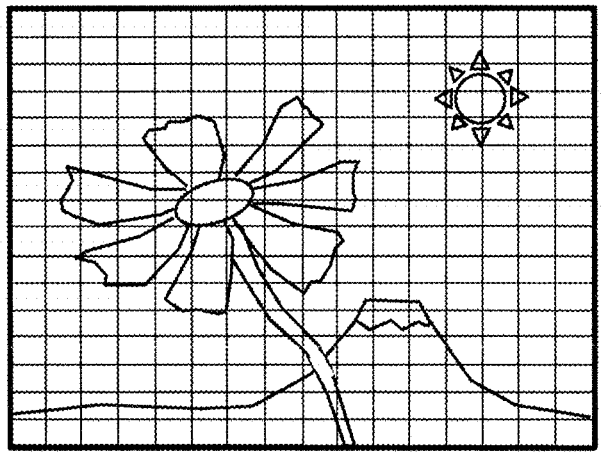
FIG. 6A and FIG. 6B are drawings showing another example of image output information processing when shooting at a plurality of shooting conditions, in the camera of the first embodiment of the present invention.
Figure 7A:
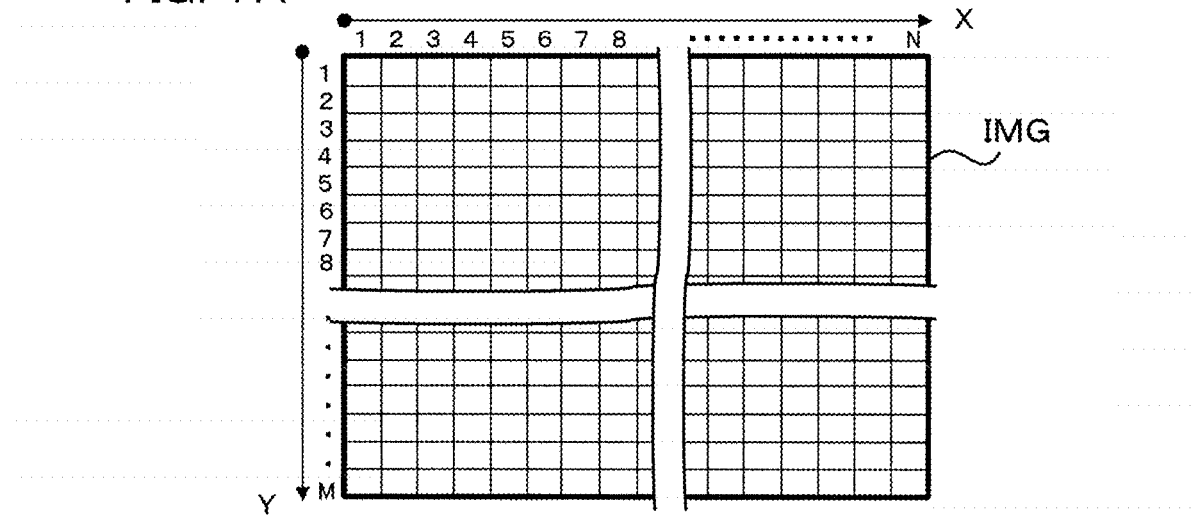
FIG. 7A and FIG. 7B are drawings for explaining storage of associated information in a case where shooting has been performed at a plurality of shooting conditions in the camera of the first embodiment of the present invention.

The image associated information processing section 200 is part of the above-described processor, and functions as an image associated information processing section that performs processing to associate image region information relating to image regions where shooting is carried out at different shooting conditions (for example, image regions determined by a boundary line LINE in FIG. 4B and FIG. 5A, and image regions determined by blocks shown in FIG. 6A and FIG. 7A) and image associated information of the image regions, for image data of one frame that has been taken at a plurality of shooting conditions.

Image data for one frame that has been taken at a plurality of shooting conditions is image data that has been formed by the image sensor. Shutter speed is treated as image associated information (refer to FIG. 3A and FIG. 3B that will be described later). Image associated information is at least one of shutter speed, ISO sensitivity, focal length and exposure control value (EV value), which are shooting conditions for each image region. Image associated information is at least one of a statistical value for pixel output (histogram, EV value), exposure offset amount (EV value) on subject distance, which are values that are calculated using pixel output contained in each image region.

The region information processing section 201 is a part of the above-described processor, and can divide the imaging surface of the image sensor 15 into a plurality of regions either automatically or in accordance with a user command. For image data of one frame (including a combined image in a second embodiment that will be described later), in a case where shooting conditions and image output information are different for every pixel address or region of an image, information on these pixel addresses or image regions is extracted, and associated with shooting conditions and image output information.

The shooting condition processing section 202 is part of the above described processor, and for image data of one frame (including a combined image in the second embodiment that will be described later) in a case where shooting conditions are different for every pixel address or every image region, extracts shooting conditions for each of these pixel addresses or image regions. As shooting conditions the shooting condition processing section 202 may extract shutter speed, sensitivity (gain), focal length (zoom information), aperture value etc., and may also extract shooting date, whether or not flash was used, exposure control information (under, correct, over), art filter settings, or WB (white balance) settings as shooting conditions. These shooting conditions are calculated by the system controller 21 based on subject brightness for every region etc., and so the shooting condition processing section 202 extracts shooting conditions that have been calculated by the system controller 21. An example of shooting conditions that have been extracted by the shooting condition processing section 202 will be described later using FIG. 4A and FIG. 4B.

The image output information processing section 203 is part of the above described processor, and for image data of one frame (including a combined image in the second embodiment that will be described later) in a case where image output information is different for every pixel address or every image region, extracts image output information for each of these pixel addresses or image regions. As image output information, it is possible to extract histogram information showing distribution of subject brightness values, and also exposure (offset from proper exposure, EV values), and if AF (Auto Focus) is set and image plane phase difference AF is adopted it is possible to extract information on subject distance. An example of image output information that has been extracted by the image output information processing section 203 will be described later using FIG. 5A and FIG. 5B.

The image data generating section 204 is part of the above described processor, and associates region information with shooting condition and image output information, and stores this data that has been associated together with the image data in an external memory 23. A data structure for image data and data that has been associated with this image data will be described later using FIG. 7B. The image data generating section 204 functions as an image data generating section that stores image region information that has been associated with image data by an image information association processing section, and image associated information for image regions, as metadata of the image data.

The gain application section 26 has a gain application circuit, and applies a gain value to the image data parts has been output from the image sensor 15. Pixel output is multiplied in accordance with the gain value. The gain application section 26 not only applies gain values uniformly to all pixels of image data of a single frame, but can also apply different gain values to each region that has been divided by the region information processing section 201. The gain application section 26 functions as a gain application section that supplies gain to image outputs of every pixel or every line, and treats gain values as image associated information.

It should be noted that application of a gain value to the image data is not limited to being carried out by the gain application section 26 and may be carried out in the image sensor 15. Specifically, a gain application circuit may be provided internally to the image sensor 15, and application of the gain value to a pixel signal carried out in the image sensor 15.

The image combination section 27 has an image combining circuit and combines image data of a plurality of frames. As this combination processing, there are additive combination processing, averaging combination processing, relatively bright combination processing, relatively dark combination processing, HDR combination processing (combination of images that have been taken while changing exposure value), focus stacking processing (combination of images that have been taken while shifting focus position), spreading a plurality of image data over an image region and creating a combined photograph for one frame (photo story) etc. The image combination section 27 functions as an image combination section that combines image data of a plurality of frames, and image data of one frame that has been taken at a plurality of shooting conditions is image data that is combined by the image combination section.

The development processing section 28 has a development processing circuit, and applies development processing to image data that has been read out from the image sensor 15 or to image data that has been temporarily held in internal memory 22. As development processing there are demosaicing processing, noise removal processing, WB balance processing, edge enhancement processing etc. The development processing section 28 also carries out image data compression and expansion processing such as JPEG and MPEG etc. In the event that the number of pixels of the image sensor 15 and the display section 24 is different, resizing processing is also carried out to increase or reduce the number of pixels so as to match the number of pixels of the display section 24.

The display image generating section 29 has a display image generating circuit, and generates a live view image or image for playback display of a taken image, and generates operation menu images etc. The generated image is displayed on the display section 24. Further, with this embodiment an image that has shooting associated information that has been extracted by the image output information processing section 203 superimposed on a live view or playback image is generated, and displayed on the display section 24.

It should be noted that in this embodiment, the image processing section 20 is a dedicated image processing processor comprising an arithmetic circuit that carries out image processing calculations, a CPU (Central Processing Unit) and a memory that stores programs. Within the image processing section 20, the gain application section 26, image combination section 27, development processing section 28 and display image generating section 29 are comprised of arithmetic circuits, while the remaining sections are executed by the CPU using programs. However, this structure is not limiting, and it is also possible to have a structure where, for example, image processing calculations are handled in a general purpose signal processing processor such as a digital signal processor (DSP), based on image processing programs. Certain sections may also be implemented by the system controller 21, that will we described later, in accordance with programs.

The internal memory 22 has an electrically rewritable volatile memory, for example, a DRAM (Dynamic Random Access Memory), and an electrically rewritable nonvolatile memory, for example, flash memory. The internal memory 22 stores and holds image data and control programs for carrying out overall camera control etc. The internal memory 22 functions as a storage section for storing image data.

An external memory 23 has a portable memory medium, such as SD card or CF card, and this memory medium can be removed from and fitted into the camera body. It is possible to carry out storage of image data to the external memory 23, and the previously described data that has been associated with the image data is also stored together with the image data. A user of this device can remove the external memory 23 from the camera body, and carry out playback of image data in another device.

The display section 24 is a TFT (Thin Film Transistor) liquid crystal display arranged on a rear surface part of the camera body, or an EVF (Electronic View Finder) that can be viewed via an eyepiece, and displays information relating to operations of this device, image data, and information relating to image data etc. The display section 24 functions as a display that displays image region information and image associated information superimposed on image data.

An input section 25 has button type and switch type operation members and a touch panel etc., with operating states of the operation members being detected and detection results output to the system controller 21. The system controller 21 carries out control of the camera in accordance with input states to this input section 25. Using a touch panel or the like it is possible to carry out designation of regions, which will be described later. It is also possible to carry out setting of shooting conditions (for example setting of shutter speed and ISO sensitivity) and to carry out image processing settings (WB setting, noise reduction processing, art filter), for every region. The input section 25 functions as a shooting condition input section that receives inputs of shooting conditions from the photographer, and sets shooting conditions for each of a plurality of image regions in accordance with signals from the shooting condition input section.

The system controller 21 has a CPU (Central Processing Unit) and peripheral circuits and memory for the CPU. The CPU implements the overall control of the camera by controlling each of the sections within the camera 1 in accordance with programs stored in memory.

Next, operation of the camera of this embodiment will be described using the flowchart shown in FIG. 2. This flowchart is executed by the CPU within the system controller 21 controlling each of the sections within the camera in accordance with programs stored in the internal memory 22.

Figure 2:
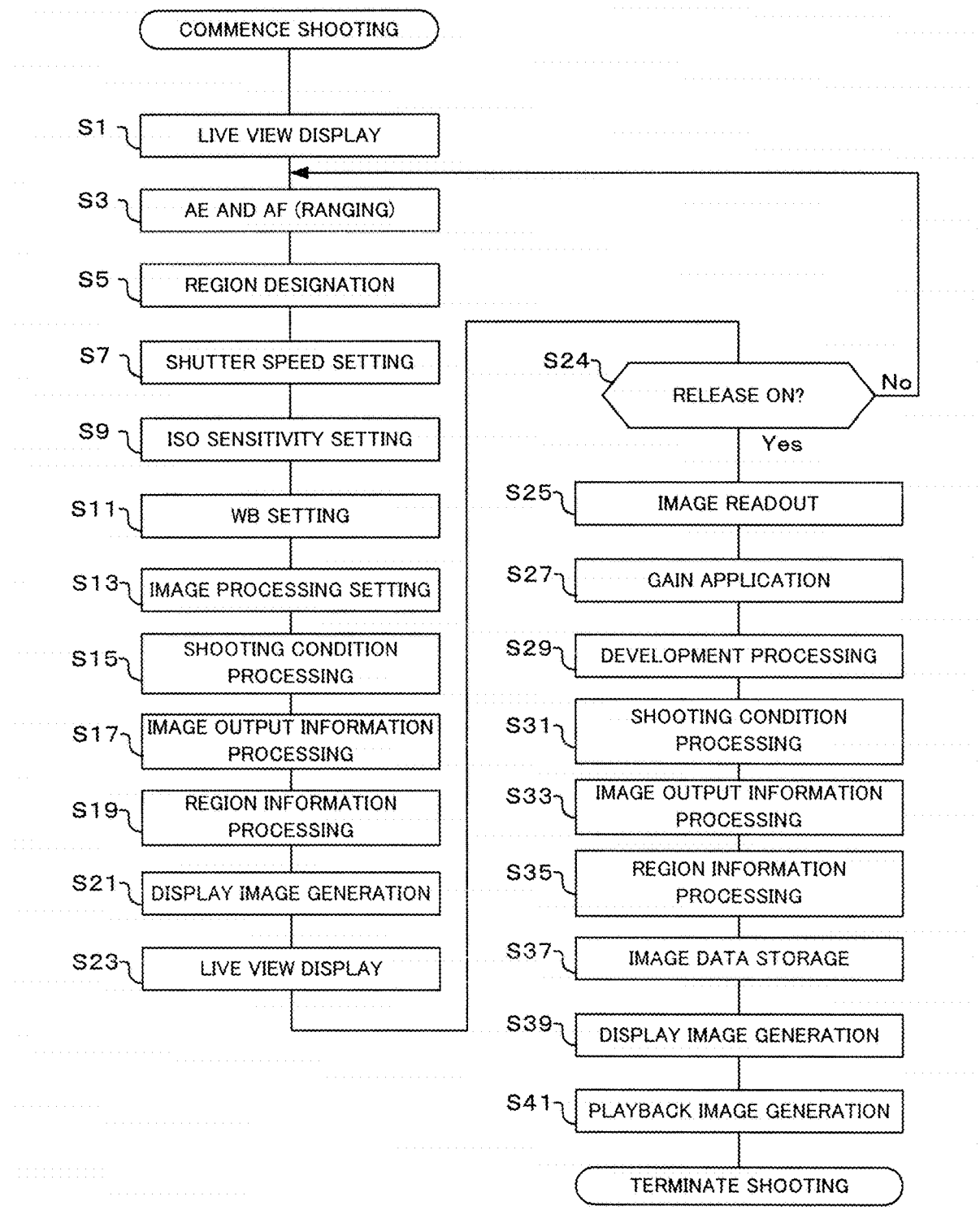
FIG. 2 is a flowchart showing operation of the camera of a first embodiment of the present invention.

If the flowchart of FIG. 2 is commenced, first live view is displayed (S1). Here, the aperture 13 is set to a wide-open aperture value and the shutter 14 is placed in an open state, and a subject image is displayed on the display section 24 based on image data from the image sensor 15. Readout of the image sensor 15 carried out by the drive control section 11 is carried out in normal mode.

Next, AE and AF (ranging) are carried out (S3). Here, in order to carry out AE (auto exposure: automatic exposure control), subject brightness is detected based on image data from the image sensor 15. AF (auto focus) is also carried out. In the event that the image sensor 15 is utilizing an image plane phase difference imager, ranging is carried out over the entire pixel region. Subject brightness and ranging are carried out in increments of each region designated in the next step and the data is associated with its respective region.

Once AE and AF have been carried out, next region designation is carried out (S5). Within a screen corresponding to the imaging surface of the image sensor 15 is divided into a plurality of regions. Division is the division of an image into regions by the user with operation members of the input section 25, such as a touch panel. As well as manual setting by the user, this designation of regions may be carried out automatically based on subject brightness and ranging results. In the example shown in FIG. 4B, the user performs designation by moving a dividing line LINE up and down. It is possible to set shooting conditions and image processing for each region that has been designated (refer to S7-S13).

Once region designation has been carried out, next setting of shutter speed is carried out (S7). As was described using FIG. 3A and FIG. 3B, the image sensor 15 of this embodiment can change shutter speed for each region (each pixel). Shutter speed is therefore set for each region that was set in step S5. At the time of this setting shutter speed may be determined automatically so as to achieve optimal exposure based on subject brightness for each region, or may be set manually by the user.

If shutter speed has been set, next setting of ISO sensitivity is carried out (S9). Here, the gain application section 26 applies a gain value corresponding to ISO sensitivity for every region that was set in step S5. It should be noted that as was described previously, in a case where the image sensor 15 has a function to set gain for every region, setting of ISO sensitivity may also be carried out in the image sensor 15.

Once setting of ISO sensitivity has been carried out, next setting of WB (white balance) is carried out (S11). Here the development processing section 28 carries out setting of WB for each region that was set in step S5. In a case where light sources of various color temperatures are shown within the screen, it is possible to achieve a picture that appears natural by setting WB for every region in accordance with that light source.

If setting of WB has been carried out, next setting of image processing is carried out (S13). Settings for noise reduction and settings for art filters are changed for every region of the image that was set in step S5, in accordance with the user's preference.

Once setting of image processing has been carried out, next shooting condition processing is carried out (S15). Here, the shooting condition processing section 202 extracts shooting conditions that have been set by the system controller 21 for every region that was set in step S5.

Once processing for shooting conditions has been carried out, next image output information processing is carried out (S17). Here the image output information processing section 203 extracts image output information from a live view image, for every region that was set in step S5. The image output information, as was described previously, is a histogram showing subject brightness distribution, EV value representing offset from proper exposure value etc.

Once image output information processing has been carried out, next region information processing is carried out (S19). Here, in a case where shooting conditions (step S15) and image output information (step S17) that were set for each region (each pixel) are different, these shooting conditions and image output information associated with each other.

Once region information processing has been carried out, next generation of a display image is carried out (S21). Here the display image generating section 29 generates an image in which image region information, and shooting conditions and image output information, is superimposed on the live view image. It should be noted that the live view image is created in accordance with shooting conditions etc. that have been set. For example, in a case where shutter speed has been shifted from the correct shutter speed towards a faster shutter speed, a live view image may be generated with the electronic shutter of the image sensor 15 shifted towards a higher speed.

If generation of a display image has been carried out, live view display is next carried out (S23). Here, an image that was generated by the display image generating section 29 in step S21 is displayed as a live view image. The user is able to grasp what shooting conditions were set for each of the plurality of regions and what type of output resulted for each region.

Once live view display has been carried out, it is next determined whether or not a release switch is on (S23). In a case where the user observes a live view image that has been displayed on the display section 24 and has achieved a desired composition, and in a case where, while looking at shooting conditions and image output information for every image region that have been superimposed on the live view image, shooting conditions etc. are adjusted to achieve a desired composition, a release button is pressed down fully. If a release switch is on as a result of the release button being pressed down fully, shooting is commenced. In a case where the release switch has not been turned on processing returns to step S3 and the previously described operations are executed. In this case the input section 25 detects operating states of the operation members that have been operated by the user and reflects detection results in actual operation.

If the result of determination in step S23 is that shooting is to be commenced, the system controller 21 controls aperture value of the aperture 13, controls shutter speed of the shutter 14, and controls imaging by the image sensor 15. It should be noted that in a case where the shutter speed is different for every region, the electronic shutter of the image sensor 15 may be utilized in addition to the shutter 14. Specifically, the longest shutter speed is controlled using the shutter 14, and for regions where the shutter speed shorter than this the shutter speed is controlled using the electronic shutter. For shooting conditions other than shutter speed also, imaging operations are executed in accordance with conditions that have been set.

If an exposure time determined by the shutter speed has elapsed, read out of image data is carried out (S25). Here the drive control section 11 performs readout of image data from the image sensor 15, outputs to the bus 30, and temporarily stores in the internal memory 22. It should be noted that at the time of display of a live view image in step S1 or S23, the number of pixels read out is small, but with actual shooting in a case where it has been determined in step S23 that the release switch is on, the number of pixels is greater than at the time of live view display and high definition image data is acquired.

If read out of image data has been performed, next gain is applied to the image data (S27). Here the gain application section 26 applies gained to the image data. In a case where a different gain has been set for each region (each pixel), gain is applied in accordance with the settings. It should be noted that in a case where it is possible to apply gain when reading out image data from the image sensor 15, gain may be applied when reading out from the image sensor 15 in step S25.

If gain has been applied, next development processing is carried out (S29). Here the development processing section 28 subjects image data to processing. In a case where different image processing settings (WB, art filter etc.) have been set for each region (each pixel), image processing is carried out in accordance with the settings.

Once development processing has been carried out, next shooting condition processing is carried out (S31). Here the shooting condition processing section 202 extracts shooting conditions for at the time of shooting (shutter speed, gain etc.) from the system controller 21. Also, image processing settings that have been set in the image data are also extracted by the development processing section 28. At this time, in the event that ranging is being carried out, focus position information may be extracted as a shooting condition. If region designation is carried out and shooting conditions are different for each region (each pixel), shooting conditions are extracted for each region.

Once shooting condition processing has been carried out, next image output information processing is carried out (S33). Here, the image output information processing section 203 calculates image output information (histogram information, exposure (offset from proper exposure, EV value), noise value) for every region (every pixel) that has been set from image data. In the event that region designation has not been performed, image output information for the overall image may be calculated.

Once image output information processing has been carried out, next region information processing is carried out (S35). Here, when regions have been manually designated by the user, or regions have been automatically designated, if shooting has been performed with different shooting conditions in each region (each pixel), the region information processing section 201 associates shooting conditions and image output information for each of the plurality of regions (pixels), and allocates to header data (EXIF data etc.) as metadata of the image data.

Once region information processing has been carried out, next storage of image data is carried out (S37). Here, image data is stored in the external memory 23. Also, when storing image data, metadata of the image data that was allocated to the header data in step S35 is also stored.

If storage of image data has been carried out, generation of a display image is carried out (S39). Here the display image generating section 29 generates an image in which shooting conditions or image output information for every region (every pixel) has been superimposed on image data that has been taken.

If a display image has been generated, next a playback image is displayed (S41). Here, an image that was generated in step S39 is displayed on the display section 24 as a playback image. When the playback image has been displayed, shooting conditions or image output information for each region may be displayed depending on the user's designation. In this way it is possible for the user to confirm information when necessary.

Next, control of shooting conditions using a front curtain electronic shutter of the image sensor 15 will be described using FIG. 3A and FIG. 3B. In FIG. 3A, the vertical direction corresponds to up and down direction of the imaging surface of the image sensor 15, while the horizontal direction corresponds to time. At time T1, exposure commences, sequentially, from a pixel line at a lower edge of an image towards a pixel line at an upper or edge of the image. If exposure reaches pixel Tc, commencement time is delayed until T2, and if time T2 is reached exposure is restarted, sequentially towards a pixel line at an upper edge of the image, similarly to the case of exposure at the lower edge of the image.

Then, at time T3, exposure is terminated, sequentially, from a pixel line at a lower edge of an image towards a pixel line at an upper or edge of the image. As a result of this, as shown in FIG. 3A, at the lower edge of the image exposure time becomes Td (corresponding to shutter speed), while at the upper edge of the image exposure time becomes Tu (corresponding to shutter speed). In this way, by using the front curtain electronic shutter, it is possible to change shooting conditions (in this case, shutter speed) at the top and bottom of the screen, and when shooting one frame it is possible to carry out shooting at a plurality of shooting conditions.

Figure 3A:
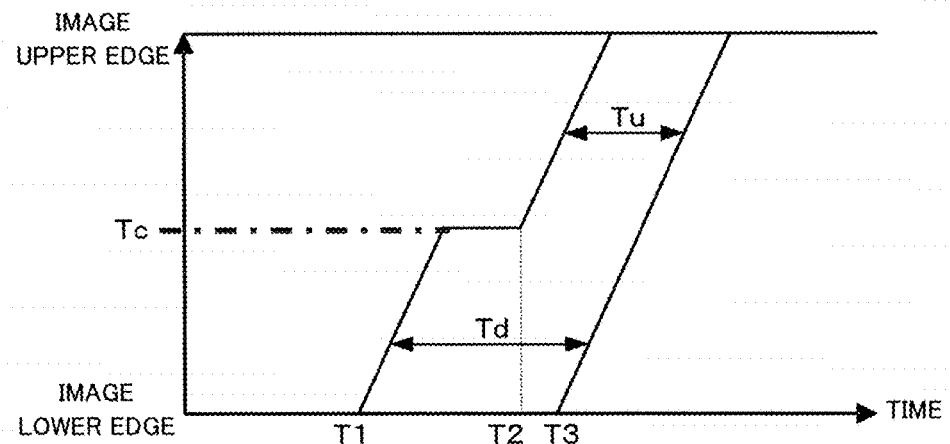
FIG. 3A and FIG. 3B are drawings for describing a front curtain electronic shutter of the camera of the first embodiment of the present invention, and gain application to achieve an effect that is similar to this.

It should be noted that with the example shown in FIG. 3A, the exposure commencement time point is not changed linearly but is shifted by a time corresponding to a pixel line Tc, while the exposure completion time point is changed linearly. However, this is not limiting, and the exposure commencement time point may be change linearly while the exposure completion is not changed linearly, and both the exposure commencement time point and the exposure completion time point need not be changed linearly. Also, with the example shown in FIG. 3A, there is only a single pixel line Tc for which shutter speed is changed, but this is not limiting and there may be two or more pixel lines for which shutter speed is changed. Also, instead of switching shutter speed at the shutter speed change position (line) Tc, the shutter speed may be changed gradually before and after Tc. In this case, it is possible to achieve a natural feeling photograph without abrupt changes in image brightness before and after the pixel line Tc.

Next, an example where the same effect as in FIG. 3A is achieved by performing control using applied gain value will be described using FIG. 3B. In this embodiment, the gain application section 26 applies gain values such as shown in FIG. 3B. However, this is not limiting, and a gain application circuit may be provided within the image sensor 15, with application of gain values such as shown in FIG. 3B being performed using this circuit.

Figure 3B:
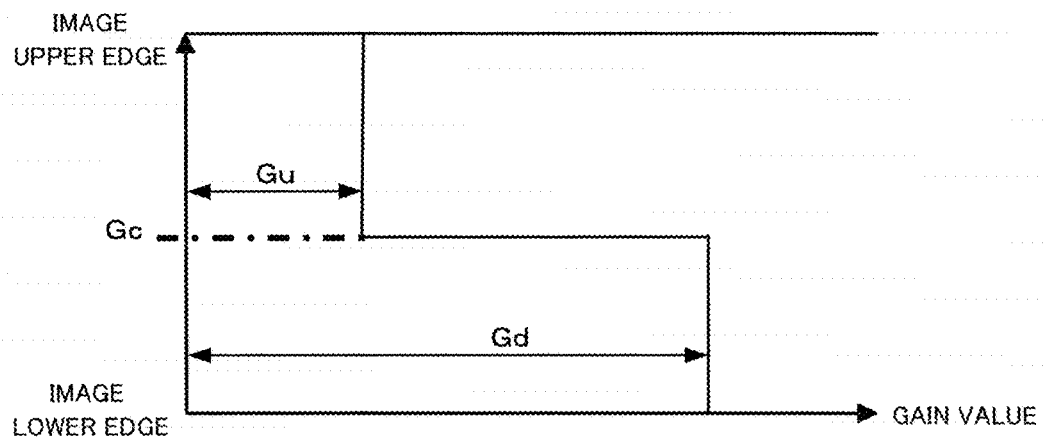

In FIG. 3B, the vertical direction corresponds to the up and down direction of the imaging surface of the image sensor 15, while the horizontal direction corresponds gain value that is applied. Gain Gd is applied to pixel values of a pixel line that has been read out from a lower edge of the image. A gain Gu is applied to pixel values of a pixel line that has been read out from above a gain value change position (line) Gc.

As a result of applying gain Gu, it is possible to obtain the same effect as when exposing with shutter speed Tu, as shown in FIG. 3A, and by applying gain Gd it is possible to obtain the same effect as when exposing with shutter speed Td. Specifically, when shooting a single frame shooting can be carried out at a plurality of shooting conditions.

It should be noted that similarly to the case of the electronic shutter, applied gain value may be changed gradually before and after the gain value change position (line) Gc. In this case, it is possible to achieve a natural feeling photograph without abrupt changes in image brightness before and after the gain value change position (line).

Next, extraction of shooting conditions using shooting condition processing (S15, S31), and display of image generated using the extracted shooting conditions (S23, S41), will be described using FIG. 4A and FIG. 4B. It should be noted that both steps of image displaying may be the same way of displaying, except that image data before image processing has been applied is different.

FIG. 4A shows an image obtained with normal shooting, namely, an image in the case of shooting with a single shooting condition. With this example shown in FIG. 4A, the lower edge of the image is dark. FIG. 4B is an image that has been generated by making shutter speed and gain value different depending on an image region, as was shown in FIG. 3A and FIG. 3B. Specifically, FIG. 4B is for a case where shutter speed at the lower part of the image is made longer than the upper part, and gain value is increased at the lower part.

With the example shown in FIG. 4A, ISO sensitivity was set to 200, and shutter speed (SS) was set to $\frac{1}{1000}$. On the other hand, with the example shown in FIG. 4B, at the upper part of the screen ISO sensitivity is set to 200 and shutter speed (SS1) is set to $\frac{1}{1000}$, while at the lower part of the screen ISO sensitivity is set to 400 and shutter speed (SS2) is set to $\frac{1}{100}$. In this way, by dividing the screen into two regions vertically and displaying shooting conditions for respective regions, it is possible for the user to ascertain shooting condition intuitively. Also, a display (LINE) indicating where on the image shooting conditions (setting values) change may be displayed superimposed on the image.

The image shown in FIG. 4B may be displayed using a playback image (S41 in FIG. 2), and may be display using a live view image (S23 in FIG. 2). If live view display is used, then it is possible to assume a completed image beforehand, and in a case where the image is not as intended it is possible to perform adjustments while looking at the live view image. So, if display of a playback image is used, it is possible to confirm completion, and if the image is not as intended it is possible to carry out shooting again after having adjusted shutter speed etc. Also, at the time of adjustment, besides changing shooting conditions such as shutter speed, the position of LINE may be displaced up or down.

It should be noted that a case is assumed where a live view image is generated under different shooting conditions from actual shooting. For example, if, with actual shooting, shooting is carried out with a different shutter speed in the regions above and below LINE, then a case is assumed where live view shows an simulated image that would be acquired with actual shooting with shutter speed being set to a common value in the regions above and below LINE while different gain values are set. In this case, since what the user wishes to ascertain with live view is shooting conditions for actual shooting (shutter speed set in regions above and below LINE), it is preferable to display shooting conditions at the time of actual shooting even if live view shooting has been performed with shooting conditions that are different to those for actual shooting. In this case, therefore, an image sensor carries out an actual shooting operation to shoot image data for a single frame at a plurality of shooting conditions, and image region information and image associated information at the time of the actual shooting operation are displayed superimposed on the live view image data before actual shooting.

Next, extraction of image output information (S17, S33), and display of an image that has been generated based on the extracted image output information (S23, S41), will be described using FIG. 5A and FIG. 5B. It should be noted that both steps of image displaying may be the same way of displaying, except that image data before image processing has been applied is different.

FIG. 5A shows calculation of shift amounts EV1 and EV2 with respect to proper exposure, as image output information, and is an example in which histograms representing brightness distribution are calculated and displayed. An output average value of subject brightness for an image region that is above the boundary line LINE is calculated, and shift EV with respect to proper exposure is calculated and displayed as EV1 at the upper right of the screen. In this case EV becomes 0 at proper exposure, EV becomes + if there is overexposure, and EV becomes − if there is under exposure.

A shift EV with respect to proper exposure for an image region that is below the boundary line LINE is calculated, and displayed as EV2 at the lower right of the screen. With the example shown in FIG. 5A EV2=−2, and represents that an exposure value is two steps underexposed from proper exposure.

A histogram HIS_1 is shown slightly toward the upper side of the left of the screen. This histogram HIS_1 is histogram display of subject brightness for an image region above the boundary line LINE. Also, a histogram HIS_2 is shown at the lower left of the screen. This histogram HIS_2 is histogram display of subject brightness for an image region below the boundary line LINE. The histograms have a curve peak that is shifted to the right as a subject becomes brighter, and a curve peak that is shifted to the left as a subject becomes darker. The user can intuitively understand the distribution of subject brightness by comparing histograms of each image region. It should be noted that the boundary line LINE can have its position changed by the user.

Calculation and display of the image output information are carried out as follows. The region information processing section 201 extracts region information for respective regions, and the image output information processing section 203 calculates pixel output for respective regions. If there is an EV value representing shift from proper exposure, then by how many steps an average value of pixel output is shifted, with respect to proper exposure (according to JPEG255LSB, 118LSB is made proper exposure), is calculated. Also, in the events that display is with histograms, statistical distribution of pixel output for respective regions is calculated.

Based on calculation results by the region information processing section 201 and the image output information processing section 203 (EV values or histogram graphs), the display image generating section 29 generates an image that is superimposed on live view or a playback image. As a result the user can ascertain features of images together with exposure of respective regions. If there is live view, exposure of respective image region can be adjusted while confirming EV values and histograms, as shown in FIG. 4B, and it is possible to carry out control so as to obtain an intended image.

Figure 5B:
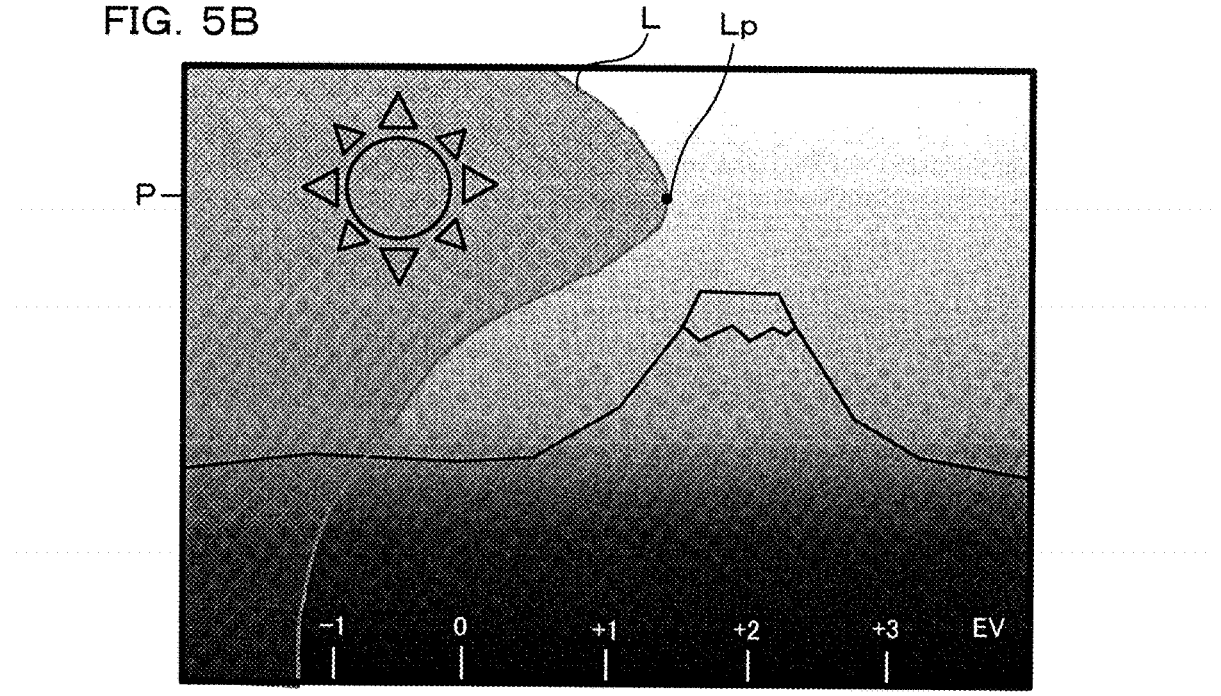

FIG. 5B shows another example of calculating and displaying image output information. With this example results of averaging brightness levels for pixels in each horizontal line are made into a graph and displayed. Specifically, brightness levels are averaged for every one line, in a pixel line direction (screen horizontal direction), and displayed as shift from proper exposure level. For example, Lp within the screen of FIG. 5B is a brightness level average value for pixel line P, and is about +1.4 EV. The graph L is a line that connects brightness levels for each pixel line. Also, the graph L may be smoothed by taking an average over a plurality of lines, or subjecting average values of each line to filter processing.

It should be noted that in FIG. 5B, amount of shift from proper exposure on the horizontal axis is displayed as an EV value, but this is not limiting and the amount of shift may also be displayed as shutter speed (Tv value). If displayed using shutter speed, it is extremely convenient in a case where shooting conditions for an image region are changed using a front curtain electronic shutter such as described previously. It is made possible to switch over a display between shutter speed display (Tv value) and EV value display (and brightness value) using setting change to be referred to when operating the front curtain electronic shutter.

In FIG. 5B, in a case where the horizontal axis shows brightness level, average levels for the pixel direction (horizontal direction) are represented. Alternatively in a case of showing shutter speed the horizontal axis may represent Tv values so that with a TV value that gives proper exposure as a reference, for example, bright portions take a minus value, and dark portions take a positive value, serving as an index on setting a front curtain electronic shutter. With respect to Tv values, if there is representation relating to exposure time, seconds or setting values inside the camera may be displayed directly. Also, in FIG. 5B, a scale is designated in single step units, but scale width and scale interval may be changed depending on a subject.

Next, another example of image region setting will be described using FIG. 6A and FIG. 6B. With the examples that were shown in FIG. 4A, FIG. 4B, FIG. 5A and FIG. 5B, the boundary line LINE extending in the horizontal direction was moved up and down by the user using a touch operation. With the example shown in FIG. 6A, the screen is divided into a plurality of blocks, the respective blocks are analyzed, and the screen may be automatically divided into image regions. Shooting information and image output information may be extracted for each of the divided image regions. With the example shown in FIG. 6A each block is made up of a plurality of pixels, but an image region may be set for each single pixel, and shooting information and pixel output information extracted for each single pixel and stored. However, in this case the information amount becomes extremely large. With this embodiment, therefore, as shown in FIG. 6A, information amount is reduced by grouping into blocks of a few tens of pixels, namely plurality of (x, y) pixels.

Figure 6B:
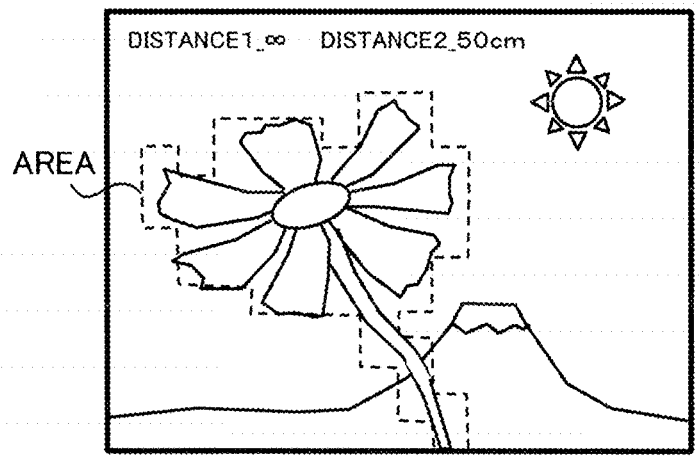

With the example shown in FIG. 6B, region division is carried out based on subject distance. With this example, the image sensor 15 has an image plane phase difference AF function (capability of detecting distance information at each pixel of the image sensor), and it is possible to ascertain subject focus information (subject distance information from the camera) for each block. The region information processing section 201 carries out division of image regions based on subject distance information for each block.

With the example shown in FIG. 6B, a photograph is taken focused on a flower (regions other than the flower where subject distance is different to that for the flower are shot out of focus, and shooting is carried out with different shooting conditions (focus conditions) in a single image). The region information processing section 201 divides a portion of the flower in the foreground into two image regions, being a region AREA shown by the dashed line, and a background portion (portions outside of the region AREA). Then, for the respective regions image output information, subject distance here, is displayed, so for the foreground region AREA 50 cm is displayed as distance 2, and in the background portion other than the region AREA ∞ (infinity) is displayed as distance 1.

Also, not only is image output information (subject distance) displayed, but together with image data, image output information is associated and stored for every image region. In this way, it is possible to utilize subject distance as information on the subject at the time of shooting after shooting also.

Figure 7B:
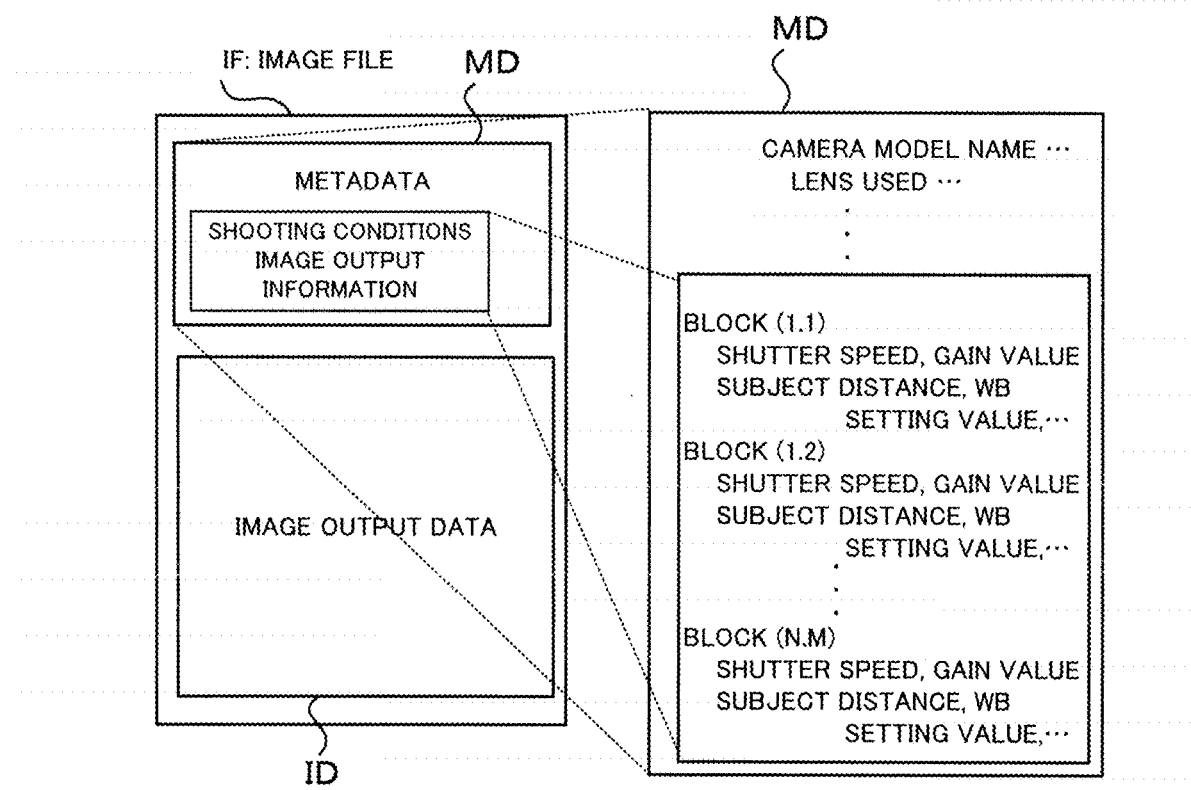

Next, a case of associating and storing shooting conditions and image output information for every image region be described using FIG. 7A and FIG. 7B. FIG. 7A shows a way of dividing regions, in a case where shooting conditions and image output information are stored, in the shooting condition processing section 202 and image output information processing section 203. Specifically, with the example shown in FIG. 7A, the imaging surface of the image sensor 15 is divided into N (integer) in the X direction and into M (integer) in the Y direction, with a plurality of pixels being included in respective regions. Shooting conditions and pixel output are extracted in each region.

FIG. 7B schematically shows a data structure of an image file. Specifically, FIG. 7B shows one example of a data structure for storing an image region information that the region information processing section 201 has output by associating with shooting conditions that have been extracted by the shooting condition processing section 202, and image output information that has been extracted by the image output information processing section 203, so as to constitute each of the blocks as shown in FIG. 7A.

An image file IF is associated with metadata MD that is associated with image data (pixel output data) ID, and stored in the internal memory 22 or external memory 23. The metadata MD stores various information such as camera model name, lens name and shooting date and time etc.

As shown in FIG. 7B, shooting condition and image output information are stored in association with each other in the metadata MD, for every sequence information of a block, which is image region information. In a general image file, a single shooting condition is stored as metadata associated with one frame of image data. However, with this embodiment, even in a case where there are different shooting conditions and image output information for each image region, it is possible to store information for each image region. In this way it is possible to associate shooting conditions and pixel output of each image region with image data, and to process and store.

It should be noted that in this embodiment, an example has been shown where image region information and image associated information is stored in a metadata storage region of an image file IF, but this is not limiting. For example, image region information and image associated information may be stored as an associated data file that is different to the image file IF (for example, stored so as to save the image file IF and the associated data file within the same folder). Also, for example, in a case where image associated information is stored for every one pixel, as a result of making data amount of the image associated information large, data amount of the image file IF becomes large, and efficiency of data processing is deteriorated (data processing time for playback, copying, and moving of image data is increased). In this type of case, if it is possible to handle the image file IF and the associated data file as separate files then it is possible to carry out data processing efficiently even if the data amount of the image region information and the image associated information is large.

In this way, in the first embodiment of the present invention, in a case where shooting has been performed with shooting conditions that differ in regions within an image of a single frame, image associated information (shooting conditions and image output information) in individual image regions is associated with image data (S15, S17 and S19 in FIG. 2). As a result, it is possible to easily confirm image associated information for each image region.

Next, a second embodiment of the present invention will be described using FIG. 8 and FIG. 9. With the first embodiment, within an image of a single frame was divided into a plurality of regions, and even in a case where shooting conditions were made different for each region respective shooting conditions and image output information was displayed, as well as being associated with image data and stored in the external memory 23 or the like. Conversely, with the second embodiment, images of a plurality of frames are combined to generate an image for a single frame, with shooting conditions and image output information for respective frames being displayed, as well as being associated with image data and stored in the external memory 23 or the like.

The structure of a camera of the second embodiment is similar to that of the first embodiment shown in FIG. 1, and so detailed description will be omitted. Regarding operation of the camera of the second embodiment, the flowchart shown in FIG. 2 is replaced with the flowchart shown in FIG. 8. This flowchart assumes a case where an image combination mode is set in which images for a plurality of frames are taken, and images are combined. As an image combination mode, there is photo story in which image data for a plurality of frame is taken, and combination is carried out so that each frame is arranged within a single frame, as if to show a single story (refer, for example, to Japanese patent laid-open number 2014-068273). Also, besides photo story, there are other modes that combine images, such as focus stacking, multiple exposure, HDR combination etc. It should be noted that in this embodiment image region designation is not carried out for every frame, and display and storage are carried out for conditions of each region of images that have been combined under various conditions.

Figure 8:
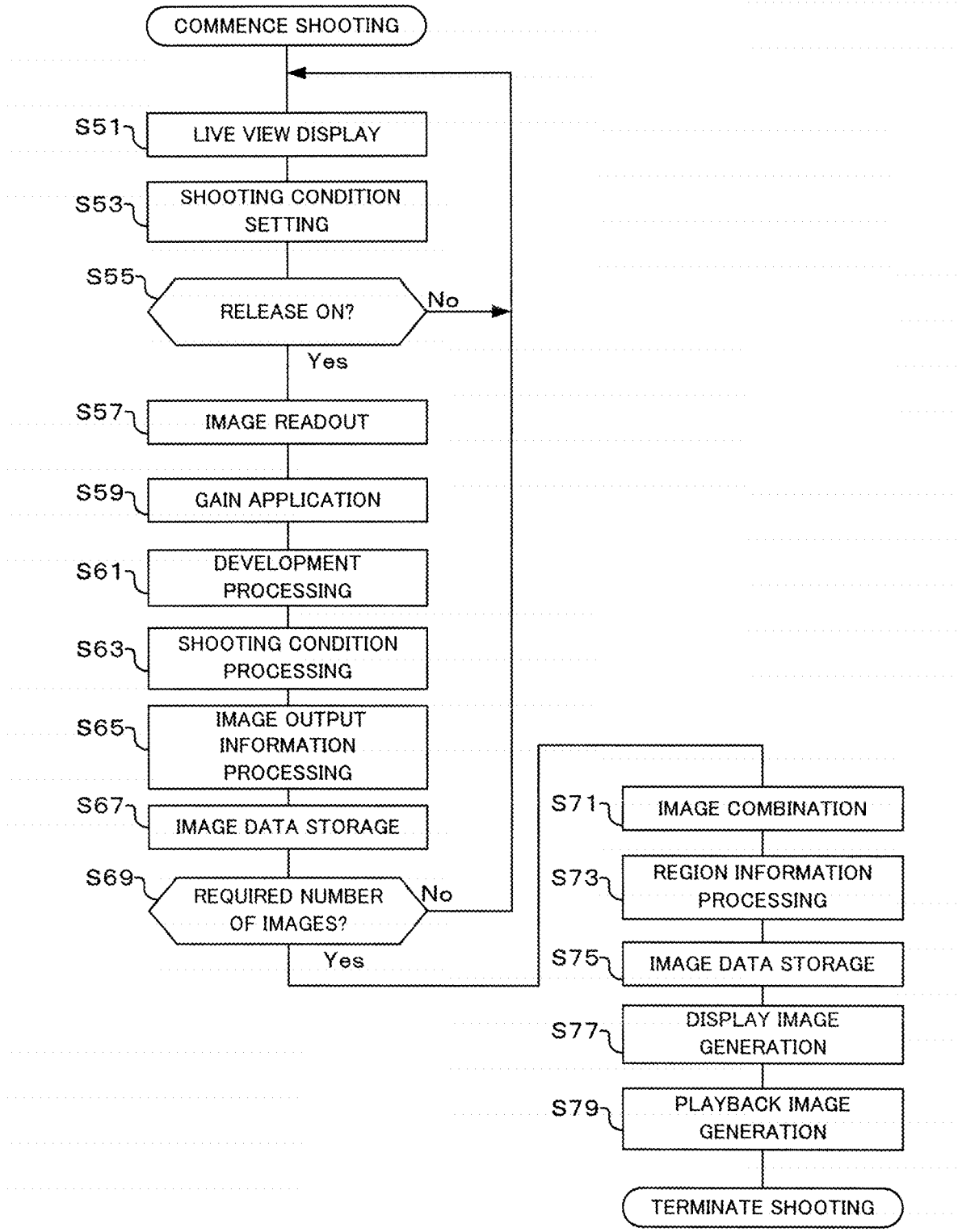
FIG. 8 is a flowchart showing operation of the camera of a second embodiment of the present invention.
Figure 9:
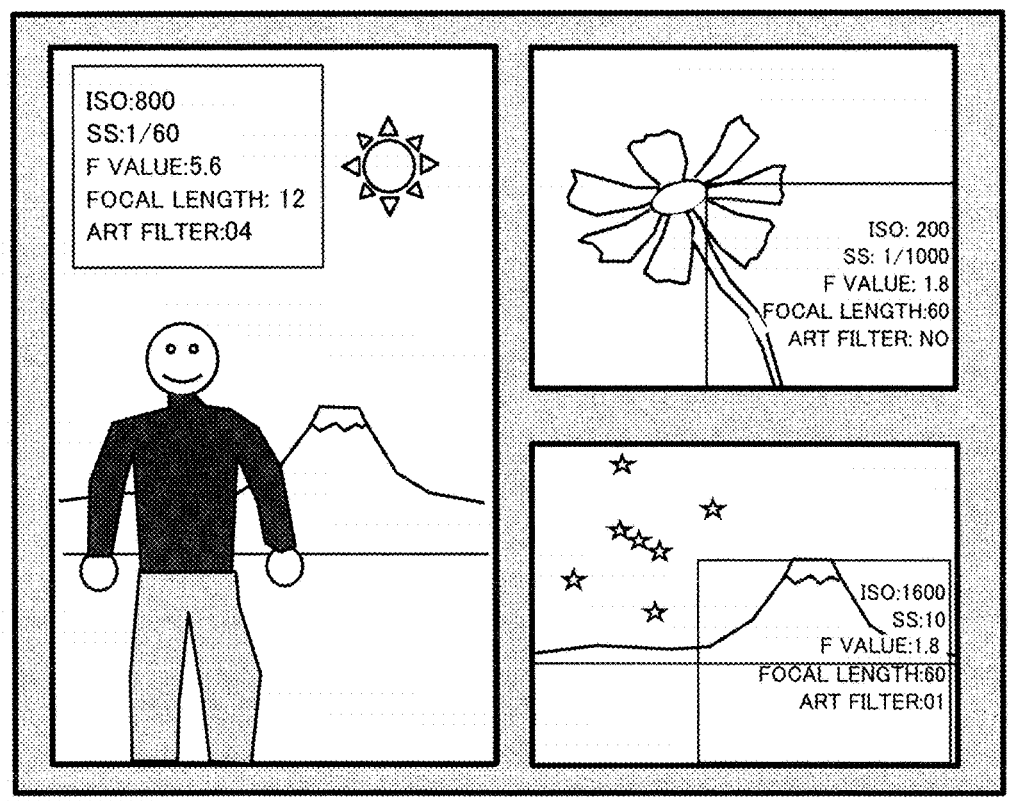
FIG. 9 is a drawing showing one example of displaying a plurality of shooting conditions, in the camera of the second embodiment of the present invention.

If the flowchart shown in FIG. 8 is entered, first live view display is carried out (S51). Here, similarly to step S1, the aperture 13 is set to a wide-open aperture value and the shutter 14 is placed in an open state, and a subject image is displayed on the display section 24 based on image data from the image sensor 15.

If live view display has been carried out, setting of shooting conditions is next carried out (S53). Here, shooting conditions that have been set by the user are acquired. In the case of photo story, shooting conditions such as shutter speed, aperture value, ISO sensitivity, image processing conditions (for example art filter) etc. are automatically or manually set for each individual frame. In the case of focus stacking, multiple exposure, HDR combination etc., if an initial frame has been set, then for second and subsequent frames shooting conditions are set in accordance with predetermined conditions. With focus stacking, a plurality of focus positions (focus lens control settings) required to create an image in which the entire image is in focus is set automatically or manually. With HDR combination, shooting for a plurality of exposure settings (shutter speed, ISO sensitivity or aperture value) so as to be able to create an image having a desired dynamic range is set automatically or manually.

Once setting of shooting conditions has been carried out it is next determined whether or not a release switch is on (S55). Here whether or not the release switch is on is determined based on detection signals for the release button from the input section 25. If the result of this determination is that the release button has not been pressed down, processing returns to step S51.

On the other hand, if the result of determination in step S55 is that the release switch is on, an image is read out (S57). If the release switch is on, the system controller 21 controls aperture value of the aperture 13, controls shutter speed of the shutter 14, and controls imaging by the image sensor 15. Then, if an exposure time determined by the shutter speed has elapsed, the drive control section 11 performs readout of image data from the image sensor 15, and outputs to the bus 30.

If readout of an image has been performed, next gain is applied to the image data (S59). Here the gain application section 26 applies gained to the image data. It should be noted that in a case where it is possible to apply gain when reading out image data from the image sensor 15, gain may also be applied when reading out from the image sensor 15 in step S57.

If gain application has been carried out, next development processing is carried out (S61). Here the development processing section 28 subjects image data to processing.

Once development processing has been carried out, next shooting condition processing is carried out (S63). Here the shooting condition processing section 202 extracts shooting conditions for at the time of shooting (shutter speed, gain etc.) from the system controller 21. Also, image processing settings that have been set in the image data are extracted from the development processing section 28. When extracting shooting conditions, the conditions are stored by associating with information indicating what frame in a sequence has been taken As shooting conditions, for example, at least one of gain, shutter speed, focal length (zoom position), whether or not a flash is being used, aperture value, exposure control information (under/correct/over) shooting date (date and time when the release button was pressed down) etc. is extracted.

Once shooting condition processing has been carried out, next image output information processing is carried out (S65). Here, the image output information processing section 203 calculates image output information from image data. As image output information, for example, at least one of histogram information, exposure (shift from proper exposure, EV value), noise value, subject distance etc. is extracted.

Once image output information processing has been carried out, next image data is stored (S67). Here, image data of a single frame that was read out in step S57 is stored in the internal memory 22 or the external memory 23. For example, in a case where continuity of shooting is required, such as for focus stacking etc., the internal memory 22 that is capable of reading and writing data is preferable. Also, in a case where rapid shooting is not required, such as in photo story, storage is carried out to the external memory 23. Also, when storing image data of a single frame, shooting conditions that have been extracted by the shooting condition processing of step S63 and image output information that has been extracted by the image output information processing of step S65 are associated with image data, and an image file is generated and stored.

Once image data has been stored it is next determined whether or not a required number of frames has been reached (S69). In an image combination mode, there are cases where a required number of frames for combination has been determined. In the event that a number of frames has been determined, in this step it is determined whether or not shooting has been completed for the required number of frames. If a required number of frames has not been determined, then it is made possible for the user to continue shooting until shooting is complete, and in this step it is determined whether or not shooting is complete. If the result of determination in this step is that the required number of frames has not been reached processing returns to step S51, shooting conditions for the next frame are set, and shooting is carried out. It should be noted that in a case where, once shooting is commenced, a predetermined number of frames are captured continuously, such as with focus stacking, the determination in step S55 may be skipped and processing advanced to step S57.

If the result of determination in step S69 is that the required number of frames has been reached, next image combination is carried out (S71). If shooting is complete, images of a plurality of frames that have been taken are combined by the image combination section 27, and a combined image is stored in the internal memory 22. For example, if there is a photo story, change of image size is carried out on the size of each frame that has been subjected to frame division, and processing to fit images within a single frame is carried out (referred to FIG. 9). Also, if there is HDR combination, combination is performed by carrying out weighting of outputs of the same pixel addresses for a plurality of frames that have been taken with changed exposure, in accordance with subject brightness. If there is focus stacking, shooting of a plurality of frames is carried out with focus position shifted, and images are combined so as to make a shift in focus for each position of the image small.

Once image combination has been carried out, next region information processing is carried out (S73). With the first embodiment a single frame was divided into image regions, but with the second embodiment a plurality of frames are subjected to image combination, and the frames correspond to respective image regions. In this step shooting conditions and image output information are extracted for each frame, and associated with image data of each frame.

For example, in a case where photo story has been set as a combination mode, the region information processing section 201 extracts address information of each frame (for example, in a case where a frame is square, coordinates of the top) as image region information, the shooting condition processing section 202 and the image output information processing section 203 extract shooting conditions and image output information of image data that has been allocated to respective frames, and these items of information are associated with each frame. Also, in a case where HDR combination has been set and, for example, images that have been taken with exposure at −1EV, 0EV, and +1EV are combined, in the combined image, image data about which exposure has been weighted the most and combined may be extracted as a shooting condition for each block such as shown in FIG. 7A. In a case where focus stacking mode has been set, each block of the image may have at what focus position an image that has been weighted the most was taken and combined extracted as a shooting condition (shooting distance) for each block.

Once region information processing has been carried out, next image data is stored (S75). Here, image data that was combined in step S71, and metadata that was associated in steps S73 and S75, are stored in the external memory 23 as an image file.

If storage of image data has been carried out, next generation of a display image is carried out (S77). Here, the display image generating section 29 generates an image in which the shooting conditions and image output information of each frame are superimposed on the image data.

Once a display image has been generated, next display of a playback image is carried out (S79). Here, a display image that was generated in step S77 is displayed on the display section 24 as a playback image. Once the playback image has been displayed this flow is terminated.

In this way, in this sequence a plurality of images for combination are taken (S57), and shooting conditions and image output information of each frame are extracted and stored (S63-S67). Then, if an image for a single frame has been generated by carrying out image combination (S71), shooting conditions and image output information for each image region (specifically each block shown in FIG. 7A) of this combined image are extracted (S73). The shooting conditions and image output information that have been extracted are stored, and made displayable (S75-S79). This means that with this embodiment, even when combining from a plurality of frames, it is possible to easily confirm image regions and image associated information.

It should be noted that with this sequence combination processing is executed after completion of shooting for a plurality of frames, but this is not limiting, and it is also possible to sequentially combine images and process the images at an image information processing section while carrying out shooting. By carrying out this type of processing it is possible, while confirming image information (shooting conditions and image output information of each frame) during combination, to carry out shooting while adjusting shooting conditions for the frames. Also, with shooting conditions other than those described above, as long as information is information that can be obtained by a general imaging apparatus, the information can be similarly processed. With image output conditions other than those described above also, if it is numerical information obtained with a general image processing apparatus, similar processing is possible.

Next, display of image associated information (shooting conditions and image output information) for a case where photo story has been set as an image combination mode will be described using FIG. 9. With the example shown in FIG. 9, three images are taken, and a combined image for a single frame is generated by respectively placing these three images at the left side, upper right, and lower right of the screen. ISO sensitivity, shutter speed (SS), aperture value (F value), focal length, and type of art filter that has been used are displayed superimposed on the respective images as shooting conditions and image output information. This means that even in a case where a combined image of a single frame has been generated from a plurality of images, it is possible to easily confirm shooting conditions and image output information of individual images.

As has been described above, with the second embodiment, even if an image for a single frame has been generated by combining a plurality of images, image associated information of individual images (shooting conditions and image output information) are correlated with image data (S63, S65 and S73 in FIG. 8). As a result, it is possible to easily confirm individual image associated information for a plurality of images.

As has been described above, with each of the embodiments of the present invention, a storage section (for example, the internal memory 22 in FIG. 1) that stores image data, an image associated information processing section (for example, the image associated information processing section 200) that, for image data of a single frame that has been taken under a plurality of shooting conditions, associates and processes image region information, relating to image regions where shooting is carried out under different shooting conditions, and image associated information of the image regions, are provided. More specifically, image data of a single frame is either image data shot under different shooting conditions for each image region of an image of a single frame (refer to the first embodiment), or image data formed by combining a plurality of images taken under different shooting conditions (refer to the second embodiment). In this way, with each of the embodiments, since image associated information for each image region is associated with image data by the image associated information processing section 200, it is possible to easily confirm image associated information for each image region.

Also, in each of the embodiments of the present invention, a display section (for example, the display section 24) is provided that displays image region information and image associated information superimposed on image data. The image region information is information representing regions within an image that have been divided by the boundary line LINE in FIG. 4B and FIG. 5A, for example, and is information on regions represented by blocks as shown in FIG. 6A and FIG. 7A. In the latter case, it is possible to display respective blocks using (x, y) coordinates. In each of the embodiments, since image associated information is displayed by the display section superimposed on an image, it is possible to grasp the image associated information intuitively.

Also, with each of the embodiments of the present invention, image data of a single frame that has been taken under a plurality of shooting conditions is image data that has been formed by an image sensor (for example, the image sensor 15). As a result, when shooting with the imaging apparatus (also including live view) it is possible to easily confirm image associated information, as described above.

Also, with each of the embodiments of the present invention, an image sensor is capable of varying shutter speed for every pixel or for every line, and shutter speed is handled as image associated information. As was described above, in a case where the image sensor is provided with an electronic shutter, it is possible to vary shutter speed for every pixel or for every line. As a result it is possible to vary shutter speed for every image region.

Also, with each of the embodiments of the present invention, image associated information is at least one of shutter speed, ISO sensitivity, focal length and exposure control value (for example, EV value), which are shooting conditions for each image region. Also, the image associated information is values calculated using pixel output included in every image region, and is at least one of statistical value of pixel output (for example, histogram, EV value), exposure shift amount (for example EV value), and subject distance. In this way, with each embodiment of the present invention, it is possible to use various information as the image associated information, and it is possible to confirm information for every image region.

Also, in each of the embodiments of the present invention a gain application section is provided that applies gain to image output for every pixel or for every line, and gain values are treated as image associated information. This means that it is possible to vary gain for every image region.

Also, with each of the embodiments of the present invention, an image combination section (for example the image combination section 27 in FIG. 1) is provided that combines image data of a plurality of frames, and image data of a single frame, that has been taken at a plurality of shooting conditions, is image data that has been combined by the image combination section. This means that it is possible to easily confirm individual shooting conditions, for an image that has been taken under a plurality of shooting conditions.

Also, with each embodiment of the present invention, there is provided an image data generating section (for example, the image data generating section 204 of FIG. 1) that stores image region information that has been associated with image data by the image associated information processing section, and image associated information of image regions, as metadata of the image data (for example, FIG. 7B). Since image associated information is stored as metadata of the image data, it is easy to associate and display the information.

Also, with each embodiment of the present invention, a shooting condition input section (for example, the input section 25 of FIG. 1) is provided that receives inputs of shooting conditions from the photographer, and shooting conditions for each of a plurality of image regions are set in accordance with signals from the shooting condition input section. As a result it is possible for the user to manually set shooting conditions.

Also, with each of the embodiments of the present invention, shooting is carried out with different shooting conditions and image data of a single frame is stored (for example, S25 in FIG. 2 and S71 in FIG. 8), and for image data of a single frame image associated information is extracted (for example, S31 and S33 in FIG. 2 and S63 and S65 in FIG. 8), and association of image data for a single frame and image associated information for every image region is carried out (for example, S35 in FIG. 2 and S73 in FIG. 8). As a result, it is possible to easily confirm image associated information for each image region.

Also, with each of the embodiments of the present invention, image data for a single frame is either, image data taken with different shooting conditions for each image region of a single shot (for example, S3-S23 in FIG. 2), or a combined image formed by combining image data acquired by shooting a plurality of times (S51-S69 in FIG. 8). This means that it is possible to easily confirm image associated information for each image region, even in a case where a plurality of shooting conditions have been set using various shooting methods.

It should be noted that in each of the embodiments of the present invention the image processing section 20 has been constructed separately from the system controller 21, but all of or some sections of these two components may be constructed together. For example, the image associated information processing section 200 may be implemented by a CPU within the system controller 21.

Also, with each of the embodiments of the present invention, some or all sections of the image processing section 20 and the system controller 21 may have a hardware structure such as gate circuits generated based on a programming language that is described using Verilog, and also a hardware structure that utilizes software such as a DSP (digital signal processor) may be used. Suitable combinations of these approaches may also be used.

Also, with each of the embodiments of the present invention, an instrument for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal, personal computer (PC), tablet type computer, gain console etc., or a camera for a scientific instrument such as a microscope, a camera for mounting on a vehicle, a surveillance camera etc. In any event, the present invention may be applied to any apparatus that can carry out shooting with varied shooting conditions.

It is possible, for example, to apply the present invention even with an image processing apparatus (such as a personal computer (PC)) where, with image data of a plurality of frames that have already been taken, image data having shooting conditions and pixel output information etc. stored as metadata are combined. Also, even if an imaging section is not provided, it is possible to apply this application as long as it is to a device that carries out processing to associate shooting conditions and image output information, for every image region (every pixel) of image data for a single frame resulting from combination of a plurality of images, with image data.

It is also possible to similarly apply the present invention as long as it is to a device provided with an image processing apparatus, such as a smart phone, microscope, or endoscope. For example, with a microscope or the like, in a case where images for a plurality of frames have been taken with varying light source wavelengths, when treating an image of a plurality of frames taken with varying wavelength as image data for a single frame, information on wavelength at the time of shooting each frame may be stored as measurement information.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An image processing apparatus comprising:
    a memory that stores first image data, and
    a processor that includes an image associated information processing section, wherein
    the image associated information processing section, for the image data of a single frame that has been taken at a plurality of shooting conditions, within the first image data that has been stored in the memory, acquires image region information, relating to image regions in which shooting is carried out at different shooting conditions, and image associated information of the image regions, associates the image region information and the image associated information and subjects the first image data to image processing, and generates second image data.

2. The image processing apparatus of claim 1, further comprising:
    a display that displays the image region information and the image associated information superimposed on the first image data.

3. The image processing apparatus of claim 1, further comprising:
    an image sensor that generates image data from a subject image, wherein
    image data for one frame that has been taken at the plurality of shooting conditions is image data that has been formed by the image sensor.

4. The image processing apparatus of claim 3, wherein
    the image sensor is capable of varying shutter speed for every pixel or for every line, and shutter speed is treated as the image associated information.

5. The image processing apparatus of claim 1, wherein
    the image associated information is at least one of shutter speed, ISO sensitivity, focal length and exposure control value (EV value), which are the shooting conditions for each image region.

6. The image processing apparatus of claim 1, wherein
    the image associated information is at least one of a statistical value for pixel output, exposure offset amount or subject distance, which are values that are calculated using pixel output contained in each of the image regions.

7. The image processing apparatus of claim 1 wherein,
    the processor further comprises:
    a gain application section that applies gain to image output for every pixel or every line, and wherein
    the image associated information processing section treats gain values as the image associated information.

8. The image processing apparatus of claim 1 wherein,
    the processor further comprises:
    an image combination section that combines image data of a plurality of frames, and wherein
    image data for one frame that has been taken at the plurality of shooting conditions is image data that has been combined by the image combination section.

9. The image processing apparatus of claim 1 wherein, the processor further comprises:
an image data generating section that stores image region information that has been associated with image data by the image associated information processing section, and image associated information for the image regions, as metadata of the image data.

10. The image processing apparatus of claim 1, further comprising:
a shooting condition input section that receives input of shooting conditions from a photographer, wherein
the image associated information processing section sets shooting conditions for each of the plurality of image regions in accordance with signals from the shooting condition input section.

11. The image processing apparatus of claim 3, wherein:
the image sensor carries out an actual shooting operation to shoot image data for a single frame at a plurality of shooting conditions, and
before actual shooting the image region information and the image associated information for at the time of the actual shooting operation are superimposed on the live view image data to be displayed.

12. An image processing method comprising:
carrying out shooting with different shooting conditions, and storing image data of a single frame,
extracting image associated information for the image data of a single frame, and
carrying out association of the image data of a single frame and the image associated information for each image region.

13. The image processing method of claim 12, wherein
the image data for a single frame has different shooting conditions for each of the image regions of a single shot.

14. The image processing method of claim 12, wherein
the image data for a single frame is generated by image combination of image data that has been acquired by carrying out shooting a plurality of times.

* * * * *